United States Patent [19]

Helwig

[11] 4,132,161
[45] Jan. 2, 1979

[54] DEVICE AND PROCESS FOR SEPARATING THE LIQUID PART FROM THE SOLID PART OF SEEDS AND FRUIT

[76] Inventor: Emmy Helwig, Gladbacher Strasse 224, Elsdorf, Fed. Rep. of Germany, 5013

[21] Appl. No.: 816,698

[22] Filed: Jul. 18, 1977

[30] Foreign Application Priority Data

Jul. 16, 1976 [DE] Fed. Rep. of Germany ....... 2632045

[51] Int. Cl.² .............................................. A23B 5/00
[52] U.S. Cl. ......................................... 99/472; 99/495
[58] Field of Search ...................... 99/275, 276, 323.4, 99/467, 469, 471, 472, 495–496, 514, 516, 537, 538; 426/426, 431, 478, 481, 484; 241/1

[56] References Cited
U.S. PATENT DOCUMENTS

| | | | |
|---|---|---|---|
| 2,494,695 | 1/1950 | Fisher | 241/1 |
| 2,589,801 | 3/1952 | Grindrod | 99/467 |
| 2,811,448 | 10/1957 | Rietz | 99/276 |
| 2,852,387 | 9/1958 | Minetti | 99/276 |
| 3,687,180 | 8/1972 | Michalon | 241/1 |
| 3,851,087 | 11/1974 | Nowlin | 99/275 |

Primary Examiner—Leonard D. Christian
Attorney, Agent, or Firm—Herbert E. Kidder

[57] ABSTRACT

A process and device for separating the liquid part from the solid part of seeds, fruit and/or plants, wherein the raw material is fed into a pressure vessel which is pressurized with gas selected in accordance with the properties of the material, the pressure in the vessel is suddenly released whereby the cells of the material are ruptured from the inside outwards by the equalizing of the pressure inside the cells on pressure release, the resultant disintegrated mash is then concentrated in a continuous leaching process with cold liquid, and after separating the unusable solids, the resultant liquid is subjected to appropriate aftertreatment for recovering the final product until the pure juice, oil or sugar has reached the required quality, the solid residue being either further processed or rejected.

8 Claims, 3 Drawing Figures

DEVICE AND PROCESS FOR SEPARATING THE LIQUID PART FROM THE SOLID PART OF SEEDS AND FRUIT

This invention relates to a device and process for separating the liquid part from the solid part of fruit and seeds for producing fruit juice and oil.

It is generally known that in order to recover the liquid part from fruit and seeds, the solids are separated with mechanical or hydraulic screw and filter presses after corresponding pretreatment.

In the case of oil-containing fruit and seeds, the considerable amount of oil still retained is extracted from the pressed solid residue with solvents and the solvents then recovered. It is also known that the liquid in the inner space does not become compressed, but instead exerts a counter-pressure equal to the externally applied pressure.

Seeds and fruit consist of small cells. The liquid components (juice, oil etc.) are enclosed in the cells by cell walls (membranes). The cell juice is always under a pressure which corresponds to atmospheric conditions. When the fruit or seeds are in a pressure vessel and an increased external pressure acts on the cell walls, a certain adaptation of the liquid pressure inside the cells takes place. If the external pressure is now suddenly interrupted, the cell walls rupture from inside outwards because the internal cell pressure is unable to reduce in such a short time, and the liquid runs out freely.

The mash consisting of fibre, fruit juice, possibly oil and other valued components, is leached in multi-stage special devices in co and/or counter current with cold or tepid water in order to recover the liquid and dissolved parts and separate it from the solids. The liquid so separated is fed to a corresponding aftertreatment for the final product to be recovered until the pure juice or oil has reached the required quality. The solid residue is separated, further processed or rejected.

This disintegration process and the corresponding devices are very suitable for recovering fruit juices of all types, in particular grape juice, or for producing edible oils from oil-containing fruit and seeds, without using mechanical or hydraulic screw or filter presses, which are of high capital and running cost. In addition, there is no danger of explosion in the case of edible oil and solvent recovery.

Summarising the typical features of the invention, these are:

1. A multi-stage disintegrating pressure vessel.
2. A separation device for separating the liquids from the solids.
3. The leaching device operating in co and/or counter current.
4. The continuous discharge of solids and fruit water in the case of oil-containing fruit and seeds.
5. The separation of water from oil in the case of plant oil production.

Two embodiments of the device for disintegrating fruit and seeds and separating the liquids from the solids followed by leaching, according to the invention, are illustrated in the drawing. The invention is not limited to the illustrated embodiments, and further modifications are possible within the scope of the invention.

In the drawings:

FIG. 1 illustrates the operating cycle and process according to the invention for recovering plant oil from oil-containing fruit and seeds as follows:

Figure 1:
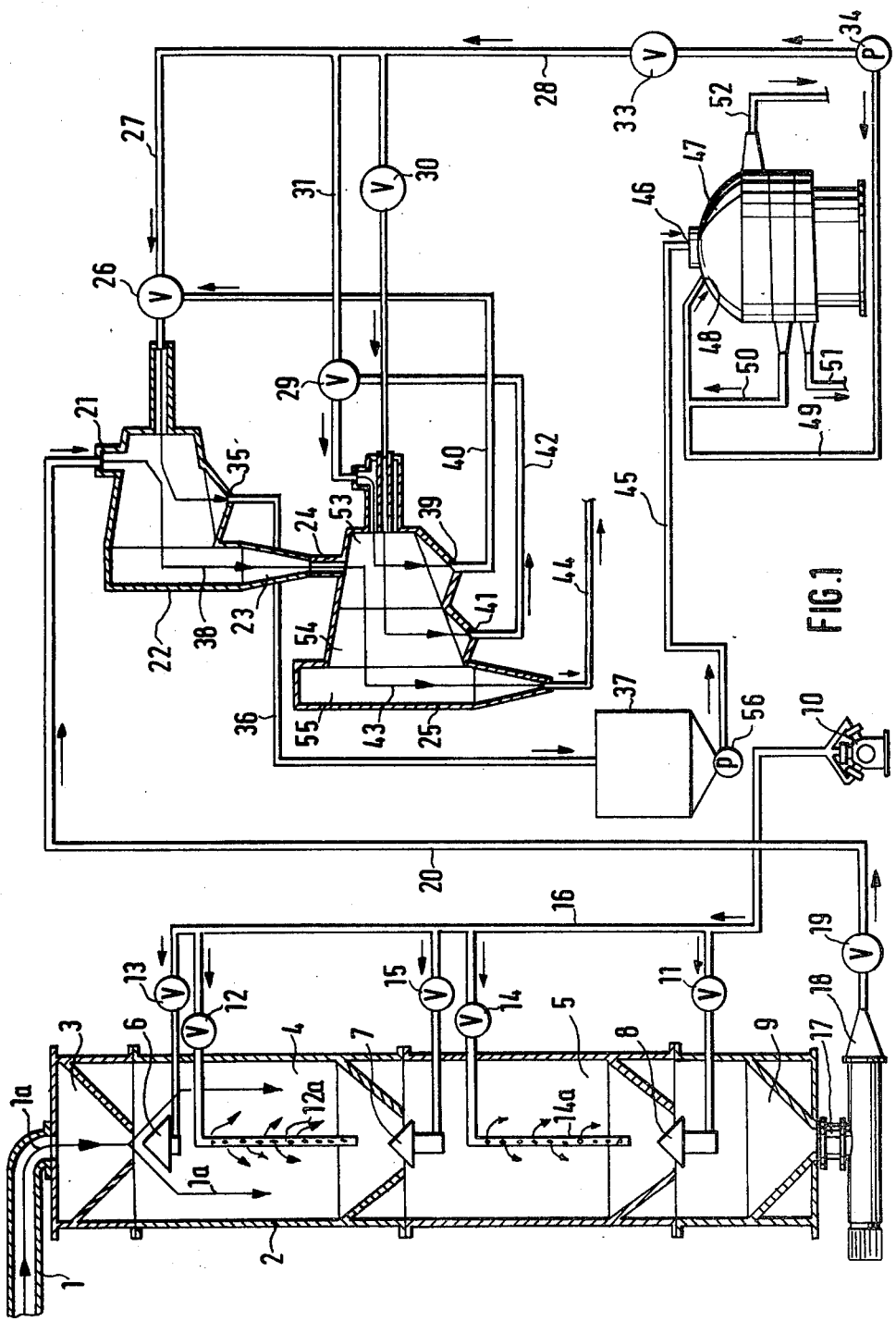
FIG. 1 illustrates the operation of the device and process for recovering plant oil and its separation from all solids and fruit water.

Fruit or seeds 1a are cleaned in a conventional manner and, after appropriate pretreatment, are fed through the proportioning device 1 to the collection chamber 3 of the pressure vessel 2. During this stage the valve 6 is open, so that the material 1a can fall unhindered into the first pressure chamber 4 of the pressure vessel 2. During this filling process, the valve 7 is closed by the compressed air fed via the control valve 15, line 16 and compressor 10. When the chamber 4 is filled with the material 1a, the valve 6 closes automatically by compressed air, fed via the valve 13, line 16 and compressor 10. When the valve 6 is closed, the compressed air valve 12 opens, this also taking its compressed air from the compressor 10 and line 16, and distributes the compressed air uniformly through the perforated pipe 12a to the material 1a in the chamber 4. When the predetermined air pressure is obtained in the chamber 4, the valve 7 opens and the material 1a quickly flows into the pressureless chamber 5, the valve 8 of which is closed. The internally pressurised cells of the material 1a suddenly flowing into the pressureless chamber 5 are ruptured from the inside outwards by this internal pressure and form a mash. When the entire quantity of material 1a has fallen from the chamber 4 into the chamber 5, the valve 7 closes by compressed air fed via the valves 15, line 16 and compressor 10. At the same time the valve 6 opens and allows the free filling of the next amount of material 1a for disintegration. When the valve 7 closes, the pressure valve 14 opens and, via the line 16 and compressor 10, feeds the determined compressed air through the perforated pipe 14a uniformly to the mash located in the chamber 5 and which has already been disintegrated once by passage from the chamber 4 into the chamber 5. When the determined pressure is reached in the chamber 5, the valve 8 opens and allows the pressurised mash 1a to enter at high speed into the flash chamber 9, by which any as yet not disintegrated cells become ruptured.

In the meantime the chamber 4 is again filled and the process is repeated alternately between chamber 4 and 5.

The disintegrated material 1a in mash form is fed by the screw pump 18, connected by the connection piece 17 to the chamber 9, and through the control valve 19, line 20 and feed hopper 21 to the first separation and leaching device 22.

The solids are separated from the liquid part by centrifugal force in the device 22, which is simultaneously washed with an oil-water mixture fed through the line 40 and three-way cock 36. This mixture now concentrated in oil is fed through the opening 35 in the device 22 and the line 36 to the collecting tank 37. The solids 38 liberated from the oil and other liquids by centrifugal force pass through the discharge hopper 23 into the feed hopper 24 of the second separation and leaching device 25. The aforesaid separation and leaching process is repeated with the difference that the separation and leaching device 25 is divided internally into three compartments. The compartments 53 and 54 serve for the two-stage separation and leaching of the material 1a and the compartment 55 for discharging the solid residue.

The separation and leaching process operates as follows:

The solids separated in 22 fall through the discharge hopper 23 and feed hopper 24 into the second device 25. As the solids enter, fresh water is fed into the compartment 54 through the line 28, branch 32 and valve 30, to leach the solids falling into this compartment, and then, enriched with the remaining oil, pass through the opening 41, line 42 and three-way cock 29 into the compartment 53, where it meets the material 1a which has fallen from the feed hopper 24. The solid residue is again leached and, enriched with oil, the mixture is fed through the opening 39, line 40 and three-way cock 26 into the first separation device.

The leaching liquid enriched with oil in this manner mixes with the major part of the oil during the leaching process and is fed in the form of a concentrated oil-water mixture through the opening 35 and line 36 into the collecting tank 37. The solid residue leached in this manner and free from any oil remains falls from the separation device 25 through the compartment 55 and discharge hopper 41 on to a conveyor system 44.

The oil-water mixture in the collecting tank 37 is fed by the pump 56 and line 45 to the inlet nozzle 46 of the special separator 47, and control water is added through the valve 48, line 49 and main valve 33. The separator 47 separates out the entire fruit water and fine solid particles and allows clean water-free oil to flow through the opening 52 to storage. The fruit water is recycled through the opening 50 to the water chamber of the separator 47, while the sludge-containing fruit water concentrate flows through the opening 51 from the nozzles of the separator drum 47.

Figure 2:
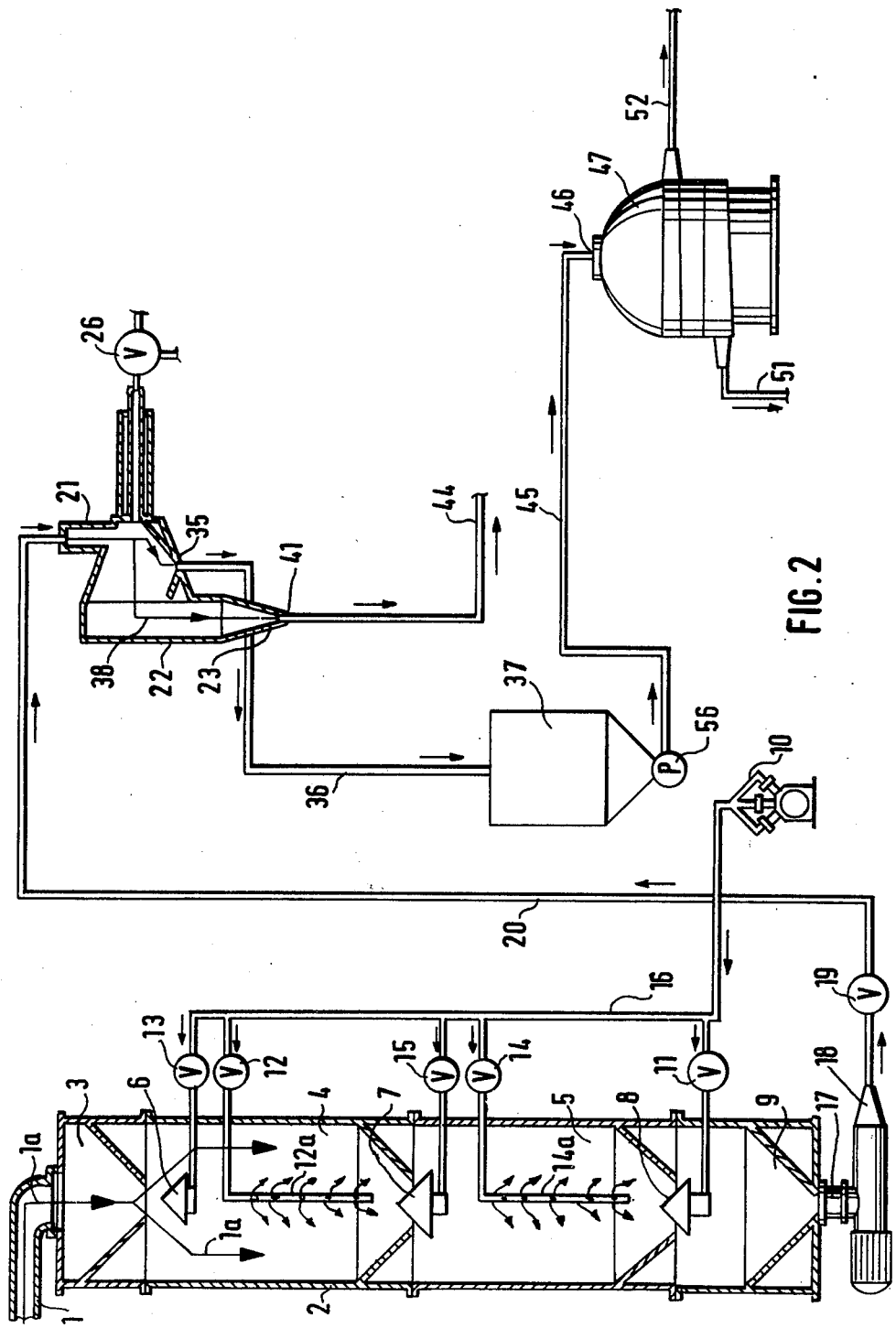
FIG. 2 shows the recovery of juice from wine grapes.

FIG. 2 shows an example of the recovery of juice from wine grapes, with the pressure disintegrating stage operating in the same manner as in FIG. 1, and in this case the material 1a referring to grape must.

After entry of the pressure disintegrated grape must 1a into the flash chamber 9, the grape must is fed to the feed hopper 21 of the separation device by the screw pump 18, control valve 19 and line 20. The three-way cock 26 remains closed and the liquid (must) is separated from the solids by centrifugal force and flows through the opening 35 and line 36 to the collecting tank 37. The solids 38 separated from all liquid fall through the discharge hopper 23 and opening 41 on to the conveyor system 44 and are conveyed away. The must is discharged from the collecting tank 37 by the pump 56 through the line 45 to the separator 47, which conveys the must, clean and free from all impurities, to further processing through the opening 52, while the solids are expelled through the opening 51.

According to the invention, this operating cycle and process may also be used for recovering sugar from sugar-containing fruit or plants.

The fruit or plants cleaned in the normal manner are subjected to preliminary crushing in a friction or chopping device. The resultant preliminary crushed material 1a is, as shown in FIG. 1, fed through the proportioning device 1 to the collection chamber 3 of the pressure vessel 2. From this point onwards, the disintegration process takes place in the same manner, the reference numeral 1a referring to sugar-containing fruit or seeds. The material 1a falling into the flash chamber 9 is fed via the screw pump 18, control valve 19 and line 20 to further processing in one or more multi-stage leaching and separating devices 22, 25, leached counter-currently, and the solids separated from the liquid part, the liquid part then being collected in the collecting tank 27.

The separated sugar-free solids fall on to a conveyor system 44 and are conveyed thereby out of the plant. The sugar may be prepared from the recovered sugar-containing liquid in various ways.

When processing hard seeds, husks or when it is required to increase the disintegration effect, an impingement device 57 appropriate for the material to be processed may be connected. This impingement device may be fitted below one or more pressure chambers under the outlet valve 7.

Figure 3:
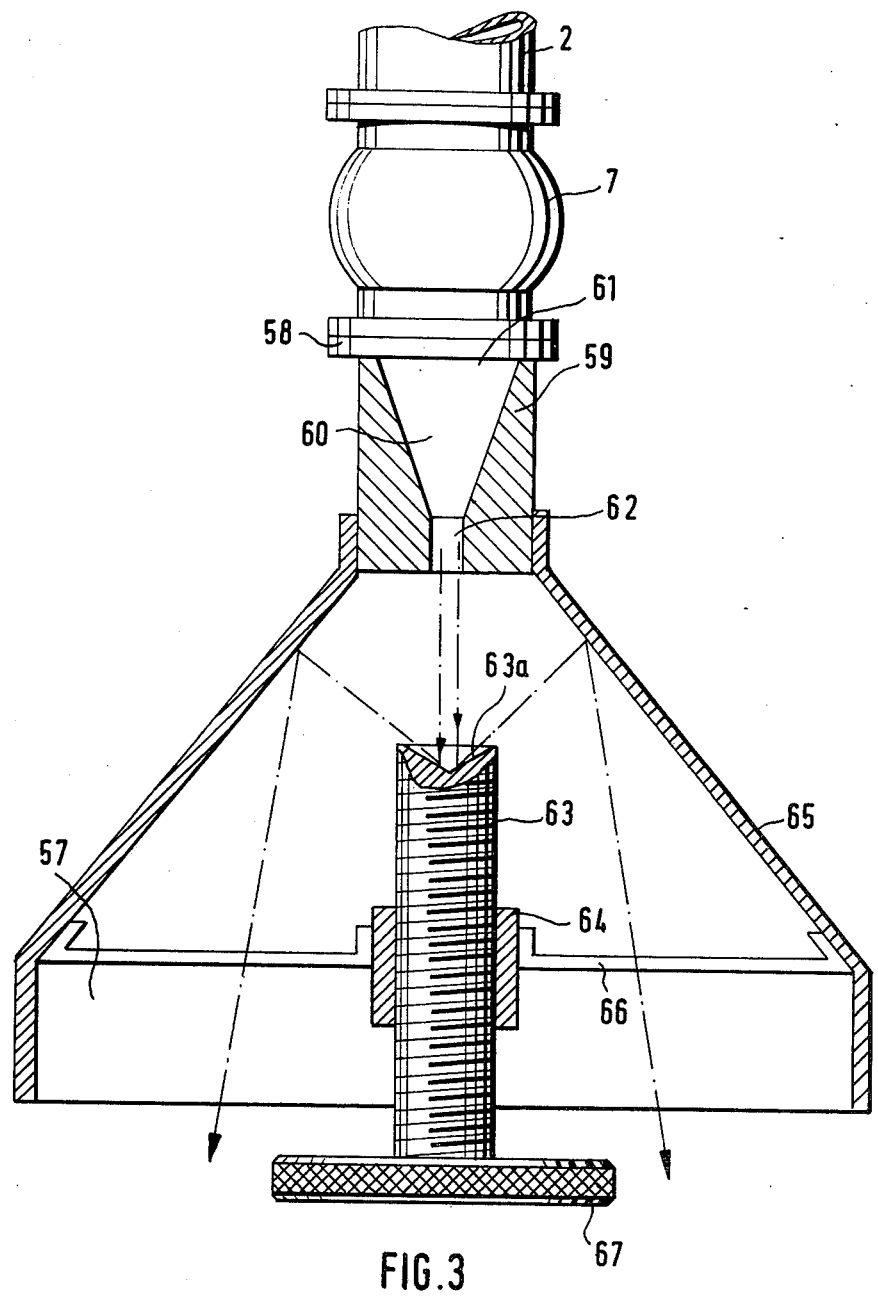
FIG. 3 shows the impingement device.

FIG. 3 shows the impingement device 57 according to the invention, consisting of the connection piece 59, which connects the impingement device 57 to the outlet valve 7 of the chosen chamber 2 by the flange 58. This connection piece comprises internally a funnel shape 60 of more or less conical form according to the material to be processed. The wider diameter 61 of the funnel shaped conical cavity corresponds to the inner diameter of the chosen outlet valve 7 of the pressure chamber 2. The outlet opening 62 of the connection piece 59 has a small diameter according to the material to be processed, and operates a jet effect such that the outflowing disintegrated material 1a in clustered form impinges on the impingement head 63 with a still higher speed. The impingement head 63 is a steel cylinder with an external thread, screwed into a support. The support 64 is fixed into the funnel shaped casing 65 by a cross piece 66. A cavity 63a of a determined angle is provided in the middle of one end of the impingement head 63 in order to vary the angle of impingement. At the opposite end, the impingement head 63 comprises a large diameter adjustment disc 67. The impingement head 63 may be screwed in and out of its support 64 at will, so as to adjust the distance between the outlet nozzle 62 and impingement head 63. If a flat impingement surface is desired, the impingement head 63 may be screwed out of the support 64 and screwed in again in an inverted disposition, so that the adjustment disc 67 lies opposite the nozzle opening 62 to give a different impingement effect.

I claim:

1. An apparatus for separating vegetable matter into a liquid part and a solid part which comprises:
    a pressure vessel having at least one high pressure chamber;
    means for charging said high pressure chamber with said vegetable matter;
    means for pressurising said high pressure chamber;
    said pressure vessel having at least one low pressure chamber located below said high pressure chamber;
    a valve means located in the bottom of said high pressure chamber and opening up into said low pressure chamber;
    means for opening said valve such that said vegetable matter passes through said valve from said high pressure chamber into said low pressure chamber rupturing the cells of said vegetable matter as said vegetable matter passes through said valve to disintegrate said vegetable matter into a mash;
    leaching-separating means for leaching out said liquid part of said mash and separating said liquid part from said solid part;
    feed means for feeding said mash from said low pressure chamber to said leaching-separating means.

2. The apparatus as claimed in claim 1 wherein said pressure vessel comprises two or more pressure chambers arranged one above the other, said pressure chambers being separated by pneumatically operated valves, whereby after pressurisation of said vegetable matter in one chamber the valve leading to the unpressurised chamber below is opened to effect pressure disintegration of said vegetable matter as said vegetable matter is fed into the chamber below, the lowest pressure chamber including a flash chamber in which said vegetable matter is finally disintegrated and collected.

3. The apparatus as claimed in claim 2 including an impingement head arranged below each said valve in the path of said vegetable matter in order to effect further disintegration of said vegetable matter by impingement on said head.

4. The apparatus as claimed in claim 3 wherein each said impingement head is held centrally below the associated valve by cross pieces and is adjustably displaceable towards and away from said valve.

5. The apparatus as claimed in claim 2, wherein said feed means comprises a conveying pump for conveying the disintegrated vegetable matter to said leaching-separator means.

6. The apparatus as claimed in claim 1 wherein said leaching-separating means comprises a multi-stage centrifugal separator in which cold liquid for leaching is fed into said mash to concentrate the liquid part therefrom, and said liquid part being discharged to a collecting tank, and the resultant solid part being conveyed to further processing.

7. The apparatus as claimed in claim 1, wherein a centrally extending perforated pipe is provided in the center of each pressure chamber for uniform distribution of pressurised gas admitted thereto.

8. The apparatus as claimed in claim 1, wherein at least one separator is provided for cleaning and clarifying the recovered product.

* * * * *